S. M. WILSON.
Modes of Making Split Bolts.

No. 153,142.    Patented July 14, 1874.

Witnesses.
A. Ruppert
[signature]

S. M. Wilson
Inventor.
D. P. Holloway & Co
Attys

UNITED STATES PATENT OFFICE.

SMITH M. WILSON, OF PITTSBURG, PENNSYLVANIA.

IMPROVEMENT IN THE MODES OF MAKING SPLIT BOLTS.

Specification forming part of Letters Patent No. 153,142, dated July 14, 1874; application filed June 24, 1874.

*To all whom it may concern:*

Be it known that I, SMITH M. WILSON, of Pittsburg, in the county of Allegheny and State of Pennsylvania, have invented a new and useful Improvement in Bolts, especially designed for securing the fish-bars on railway-bars; and I do hereby declare that the following is a full, clear, and exact description of the same, reference being had to the annexed drawings making part of this specification, in which—

Figure 1:
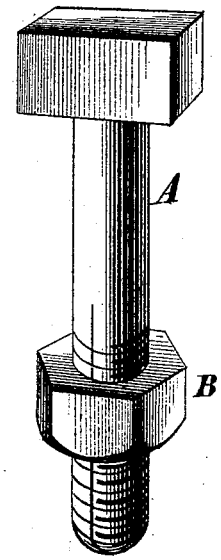
Figure 2:
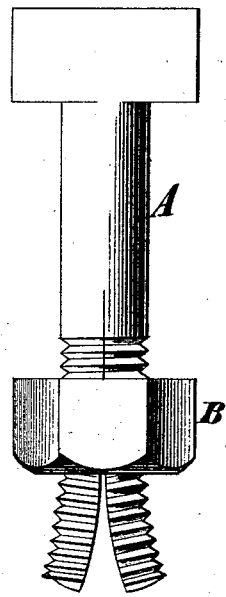

Figure 1 is a perspective view of a finished bolt and nut. Fig. 2 is an elevation showing the same after the nut has been locked by spreading the split end of the bolt; and Fig. 3 is a perspective view of the rod from which the bolt is formed.

The same letters are employed in all the figures in the designation of the same parts.

The object of this invention is to furnish a cheap bolt for securely attaching the fish-plates to the joints of railway-bars; and my invention consists in forming the bolt from a bent section of a bar of half-round iron so as to have a solid head and a split point which may be spread after the nut has been screwed on, and thus securely locking the nut in place. While this nut-lock has been especially designed for the use stated, it is, of course, applicable to many other uses, and such use does not enter into the case so as to qualify the scope of my invention.

Figure 3:
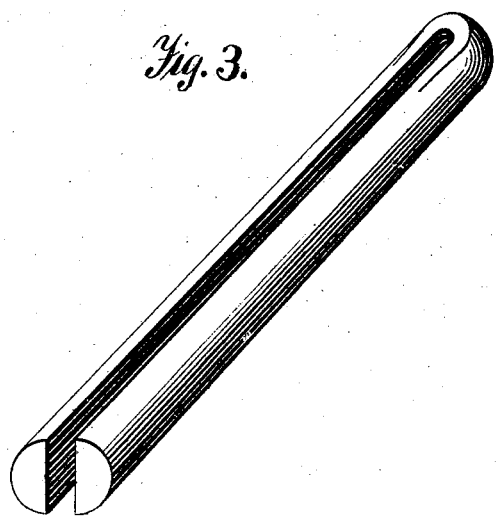

In the annexed drawings I have shown, in Fig. 3, a section of a bar of half-round iron, but so that the ends join; this I use in forming my bolts. The bar having been cut into proper lengths, the sections are bent, as shown, and then the bent end is heated to a welding-heat, and swaged into the form shown in Fig. 1 with a solid head and body or stem next the head, the threaded end remaining separate in the form of the split bolt heretofore known. The thread is then cut on the split end, which can be done readily, as in the act of swaging the opposite flat surfaces will have been brought close together, so that the die or thread cutter will make a perfect thread. When the bolt A, thus formed, is inserted, the nut B is screwed home, and a cold-chisel driven into the crevice formed between the flat faces until the halves are spread, as shown in Fig. 2. If a thin chisel is used, and driven down to the nut, a very slight deflection of the sections will lock the nut perfectly if carried to the nut. Should it become necessary to remove the nut, a clamping-tool may be made to catch the diverging ends of the bolt and draw them together, when, by the aid of a wrench, the nut may be unscrewed.

I do not claim a split bolt as of my invention, but

What I claim as my invention, and desire to secure by Letters Patent, is—

The mode of forming split bolts by swaging a solid head and neck on a bent bar of half-round iron, and then forming a thread on the unconnected end, so that the nut may be locked by merely spreading the end, substantially as set forth.

In testimony whereof I have signed my name to this specification in the presence of two subscribing witnesses.

SMITH M. WILSON.

Witnesses:
W. E. HALLOCK,
JAMES STEWART.